(12) United States Patent
Paik

(10) Patent No.: US 9,115,617 B2
(45) Date of Patent: Aug. 25, 2015

(54) HYDROGEN COMBUSTION SYSTEM WITH CLOSED-CYCLE RECYCLING OF EXHAUST GAS AND METHOD THEREOF

(75) Inventor: Hyun Jong Paik, Gyeongsangnam-do (KR)

(73) Assignee: AGENCY FOR DEFENSE DEVELOPMENT, Daejeon (KR)

(*) Notice: Subject to any disclaimer, the term of this patent is extended or adjusted under 35 U.S.C. 154(b) by 705 days.

(21) Appl. No.: 13/022,662

(22) Filed: Feb. 8, 2011

(65) Prior Publication Data

US 2011/0192139 A1 Aug. 11, 2011

(30) Foreign Application Priority Data

Feb. 11, 2010 (KR) .................. 10-2010-0012684

(51) Int. Cl.
*F02B 1/00* (2006.01)
*F01N 5/02* (2006.01)
*F01N 3/00* (2006.01)

(52) U.S. Cl.
CPC *F01N 5/02* (2013.01); *F01N 3/005* (2013.01); *Y02T 10/16* (2013.01); *Y02T 10/20* (2013.01)

(58) Field of Classification Search
CPC ..... F02B 43/10; F02D 21/04; F02M 21/0206; F02M 25/07–25/074; F02M 25/10
USPC ........ 60/274, 320, 262, 661, 39.52, 278, 279, 60/286, 299, 300, 321, 685, 686, 688; 123/568.12, DIG. 12, 1 A, 25 A
See application file for complete search history.

(56) References Cited

U.S. PATENT DOCUMENTS

| | | | | |
|---|---|---|---|---|
| 2,742,885 A | * | 4/1956 | Thwaites et al. | 60/278 |
| 3,306,035 A | * | 2/1967 | Morrell | 60/286 |
| 3,559,402 A | * | 2/1971 | Stone et al. | 60/279 |
| 3,969,899 A | * | 7/1976 | Nakazawa et al. | 60/670 |
| 3,982,878 A | * | 9/1976 | Yamane et al. | 123/DIG. 12 |
| 4,112,875 A | * | 9/1978 | Laumann et al. | 123/1 A |
| 4,144,723 A | * | 3/1979 | Morse et al. | 62/332 |
| 4,373,498 A | * | 2/1983 | Ushimura | 123/568.21 |
| 4,426,847 A | * | 1/1984 | Fischer | 60/514 |
| 4,984,426 A | | 1/1991 | Santi | |
| 5,953,900 A | | 9/1999 | Bannister et al. | |
| 6,155,212 A | * | 12/2000 | McAlister | 123/3 |
| 6,202,400 B1 | * | 3/2001 | Utamura et al. | 60/773 |
| 7,178,339 B2 | | 2/2007 | Goldmeer et al. | |
| 2009/0188476 A1 | * | 7/2009 | Sasajima et al. | 123/568.12 |
| 2010/0100300 A1 | * | 4/2010 | Brooks et al. | 60/602 |
| 2013/0333356 A1 | * | 12/2013 | Kuroki et al. | 60/278 |

* cited by examiner

*Primary Examiner* — Thomas Denion
*Assistant Examiner* — Laert Dounis
(74) *Attorney, Agent, or Firm* — Pearne & Gordon LLP

(57) ABSTRACT

Disclosed is a hydrogen combustion system with closed-cycle recycling comprising a hydrogen combustion system with closed-cycle recycling of exhaust gas, comprising: a hydrogen supplier 110 which supply hydrogen used as a fuel, a combustion chamber 120 which is located in the engine 130 and connected to the hydrogen supplying pipe 111 in which the hydrogen is combusted, a condenser 140 which converts the hot exhaust gas emitted through the discharge pipe 121 installed on the outlet of the combustion chamber 120 into the cold exhaust gas and condensed water, and a recycling pipe 150 which performs recycling of a part of the cold exhaust gas from the condenser 140 to the inlet of the combustion chamber 120.

18 Claims, 2 Drawing Sheets

HYDROGEN COMBUSTION SYSTEM WITH CLOSED-CYCLE RECYCLING OF EXHAUST GAS AND METHOD THEREOF

TECHNICAL FIELD

The present invention relates to a hydrogen combustion system with closed-cycle recycling of exhaust gas and a method thereof. More specifically, the invention relates to a hydrogen combustion system with closed-cycle recycling of exhaust gas in which hydrogen is completely combusted in the combustion chamber at lowered flame temperature, and the hot exhaust gas is cooled and a part of the exhaust gas is recycled to the combustion chamber and the rest of the exhaust gas is condensed to water so that no exhaust gas is emitted to the outside of the system, and combustion safety of the hydrogen is enhanced thereby improving efficiency and operability of the whole system. The invention also relates to a method using thereof.

BACKGROUND ART

Recently, with increasing interests in the earth's environment, hydrogen has been drawing considerable attention for its absence of carbon which is a major element of hydrocarbon fossil fuels.

Basically, hydrogen is a gas with no color, smell nor toxic, and has the largest energy generation per mass providing excellent property as a fuel, and numerous research works have been performed around the world to use hydrogen in various ways. In the case of vehicle, two types of research are being made, one being to use hydrogen directly as a fuel for heat engine and the other to use hydrogen for fuel cell.

The merit of hydrogen as a source of energy is that hydrogen generates high energy by reacting with oxygen while producing little pollution.

Therefore, in the modern society which requires low pollution vehicles, hydrogen is attractive as a fuel for heat engines. Also, hydrogen can be used for a wide range of heat engines for air planes, space vehicles and submarines.

The combustion system for hydrogen fueled heat engine, however, has some technical problems that the flame temperature of hydrogen reaches about 3000K at stoichiometric condition presenting the risk of explosion at wide range of concentration in the air of 18-59%. Therefore, there remains a technical challenge to overcome the high flame temperature and unexpected explosion.

To solve these problems, U.S. Pat. No. 7,178,339 discloses a closed-loop cooling system of hydrogen/oxygen combustor for use in submarines, which reduces the temperature of the combustion using water.

This technology, however, requires fresh water which is supplied for reducing the temperature of the combustion chamber, and additional equipment for injecting water to the combustion chamber. The technology does not disclose on the treatment of exhaust gas which is produced in the combustion chamber. Meanwhile, there may be a risk of unexpected explosion due to a high temperature hydrogen leakage resulting from incomplete combustion, which has yet to be addressed in the field.

OBJECT OF THE INVENTION

The invention has been designed to solve the above mentioned problems of prior arts, and aims to provide a hydrogen combustion system with closed-cycle recycling of exhaust gas in which hydrogen is completely combusted in the combustion chamber at lowered flame temperature, and the hot exhaust gas generated by the hydrogen combustion is cooled and a part of the cold exhaust gas is recycled to the combustion chamber and the rest of exhaust gas is condensed to water so that no exhaust gas is emitted to the outside of the system and combustion safety of the hydrogen is enhanced thereby improving efficiency and operability of the whole system.

DISCLOSURE

In order to achieve the above mentioned objects of the present invention, the invention provides a hydrogen combustion system with closed-cycle recycling of exhaust gas, comprising: a hydrogen supplier which supply hydrogen used as a fuel, a combustion chamber which is located in the engine and connected to the hydrogen supplying pipe, a condenser which converts the hot exhaust gas emitted through the discharge pipe installed on the outlet of the combustion chamber into cold exhaust gas and condensed water, and a recycling pipe which is connected between the condenser and the inlet of the combustion chamber and performs recycling of a part of the cold exhaust gas from the condenser to the inlet of the combustion chamber.

In the hydrogen combustion system of the present invention, the engine is a heat engine.

The hydrogen combustion system of the present invention further comprises an oxygen supplier including an oxygen supplying pipe and a dilution gas supplier including a dilution gas supplying pipe, which are connected to the recycling pipe so that the dilution gas for diluting hydrogen and the excessive oxygen for complete combustion of hydrogen are supplied to the combustion chamber before starting ignition of hydrogen, and the cold intake gas, oxygen and dilution gas are supplied into the combustion chamber through the recycling pipe after the combustion of hydrogen is started.

In the hydrogen combustion system of the present invention, a hydrogen flow control valve is installed at the hydrogen supplying pipe to control the flow rate of the hydrogen, oxygen flow control valve is installed at the oxygen supplying pipe to control the flow rate of the oxygen, and dilution gas flow control valve is installed at the dilution gas supplying pipe to control the flow rate of the dilution gas.

The hydrogen combustion system of the present invention comprises an injection nozzle inside the combustion chamber for injecting hydrogen fuel supplied from the hydrogen supplier into the combustion chamber through the hydrogen supplying pipe, and spark trigger installed near the injection nozzle for igniting the hydrogen fuel.

The hydrogen combustion system of the present invention further comprises a separator installed at the condenser for separating the condensed water from the cold exhaust gas which is produced by cooling and condensing of the hot exhaust gas.

In the hydrogen combustion system of the present invention, a cooling pipe in which secondary coolant flows is installed in the condenser for cooling the hot exhaust gas emitted from the combustion chamber.

In the hydrogen combustion system of the present invention, the secondary coolant may be sea water.

In the hydrogen combustion system of the present invention, a secondary coolant flow control valve is installed at the cooling pipe for controlling the flow rate of the secondary coolant.

In the hydrogen combustion system of the present invention, a blower is installed at the passage of the recycling pipe located near the inlet of the combustion chamber for driving the cold intake gas, which is a mixture of oxygen, dilution gas and water vapor, into the combustion chamber.

In the hydrogen combustion system of the present invention, the dilution gas is a chemically stable gas such as helium, argon, nitrogen, carbon dioxide, etc.

The hydrogen combustion system of the present invention further comprises a bypass pipe which is branched from the recycling pipe for bypassing a part of the cold intake gas.

In the hydrogen combustion system of the present invention, a control valve is installed at the bypass pipe for controlling the flow rate of the bypassing gas.

Also, in order to achieve object of the present invention, the invention provides a method for combusting hydrogen with closed-cycle recycling of exhaust gas, comprising the steps of: (a) combusting hydrogen in the combustion chamber under atmosphere of excessive oxygen, (b) cooling the hot exhaust gas emitted through the discharge pipe of the combustion chamber into cold exhaust gas by the condenser, and (c) recycling a part of the cold exhaust gas from the condenser to the combustion chamber through the recycling pipe.

In the method for combusting hydrogen of the present invention, in the step (a), the dilution gas is prefilled in the combustion chamber, and in the step (b), the hot exhaust gas is cooled by secondary coolant at the condenser.

In the method for combusting hydrogen of the present invention, in the step (c) oxygen and dilution gas are supplied to the cold intake gas recycled to the combustion chamber.

In the method for combusting hydrogen of the present invention, a large amount of the dilution gas can be urgently injected into the combustion chamber in order to reduce the concentration of the hydrogen below explosion point in case when the combustion of the hydrogen is stopped by abnormal event such as extinction of combustion or inadequate ignition.

In the method for combusting hydrogen of the present invention, the state of combustion of hydrogen in the combustion chamber may be controlled by the flow rates of hydrogen, oxygen, dilution gas, secondary coolant and the cold intake gas. The flow rate of cold intake gas can be controlled, for example, by adjusting the rotating speed of the blower installed at the recycling pipe.

In the method for combusting hydrogen of the present invention, the hot exhaust gas is composed of residual oxygen, dilution gas and water vapor.

In the method for combusting hydrogen of the present invention, in the step (b) further comprises a step of separating the condensed water from the cold exhaust gas.

In the method for combusting hydrogen of the present invention, the rate of cooling and condensing of the hot exhaust gas is controlled mainly by the flow rate of secondary coolant.

In the method for combusting hydrogen of the present invention, in the step (d) the cold intake gas, which is a mixture of oxygen, dilution gas and water vapor, is sent to the combustion chamber by the blower installed at the recycling pipe.

In the method for combusting hydrogen of the present invention, in the step (e) a part of the cold intake gas may be bypassed from the outlet of the blower to the outlet of the combustion chamber.

Effect of the Invention

By using the present invention, hydrogen is completely combusted in the combustion chamber at lowered flame temperature, and the hot exhaust gas generated by the hydrogen combustion is cooled and a part of the cold exhaust gas is recycled to the combustion chamber and the rest of exhaust gas is condensed to water so that no exhaust gas is emitted to the outside of the system and combustion safety of the hydrogen is enhanced thereby improving efficiency and operability of the whole system. The system of the present invention can be applied to various heat engines including internal or external combustion engines, and especially useful for submarines since the system does not emit exhaust gas.

EXAMPLES

Preferable examples of the present invention will now be described with reference to the drawings attached.

Example 1

Figure 1:
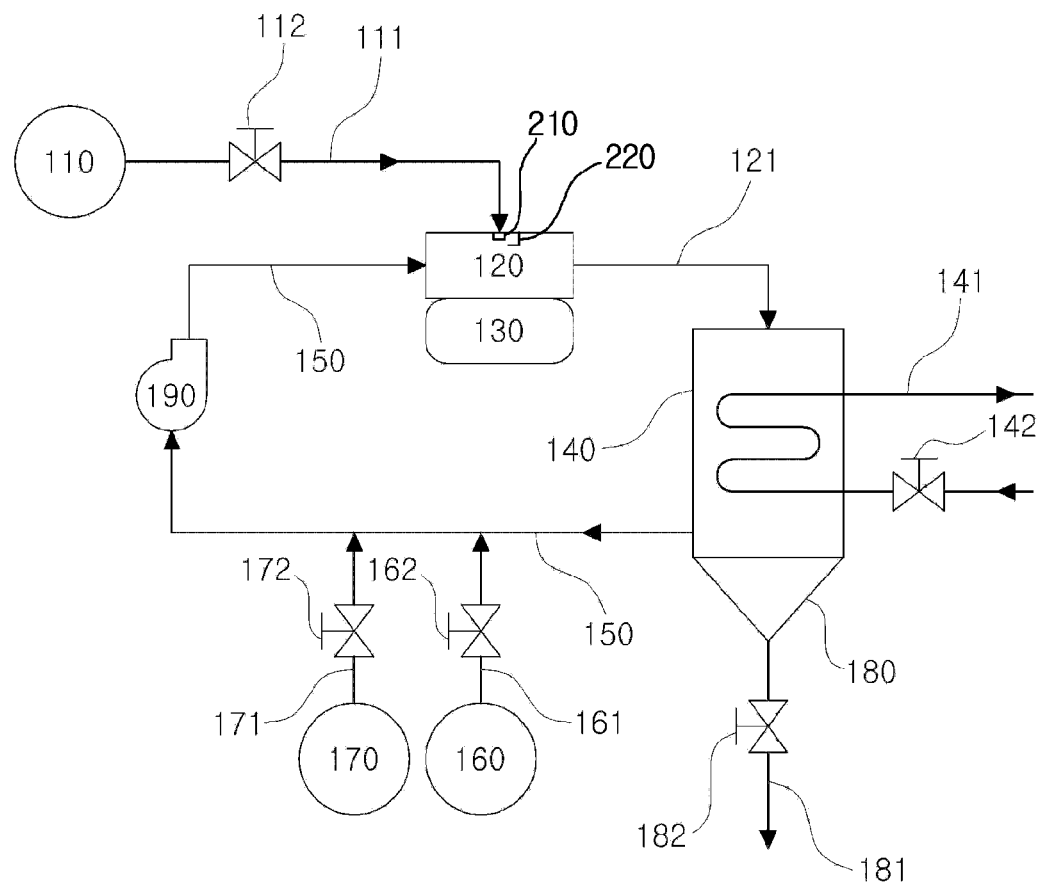
FIG. 1 schematically illustrates the construction of the hydrogen combustion system with closed-cycle recycling of exhaust gas according to the first embodiment of the present invention.

FIG. 1 schematically illustrates the construction of the hydrogen combustion system with closed-cycle recycling of exhaust gas according to the first embodiment of the present invention.

As shown in FIG. 1, the hydrogen combustion system with closed-cycle recycling of exhaust gas comprises a hydrogen supplier 110 which supply hydrogen used as a fuel, a combustion chamber 120 which is located in the engine 130 and connected to the hydrogen supplying pipe 111, a condenser 140 which converts the hot exhaust gas emitted through the discharge pipe 121 installed on the outlet of the combustion chamber 120 into cold exhaust gas and condensed water, and a recycling pipe 150 which is connected between the condenser 140 and the inlet of the combustion chamber 120 and performs recycling of a part of the cold exhaust gas from the condenser 140 to the inlet of the combustion chamber 120.

Also, the hydrogen combustion system of the present invention further comprises an oxygen supplier 160 including an oxygen supplying pipe 161 and a dilution gas supplier 170 including a dilution gas supplying pipe 171, which are connected to the recycling pipe 150 respectively so that oxygen and dilution gas are added to the cold intake gas recycled into the combustion chamber 120. During normal operation, the supplying flow rate of dilution gas may be little if the flame temperature of hydrogen is sufficiently low.

Also inside the combustion chamber 120, a hydrogen injection nozzle 210 is installed in the combustion chamber 120 through the hydrogen supplying pipe 111, a spark trigger 220 is installed near the hydrogen injection nozzle 210 for igniting the hydrogen, a recycling pipe 150 in which the mixture of gases (simply referred to as 'cold intake gas') composed of cold exhaust gas, oxygen and dilution gas flows into the combustion chamber 120, and a discharge pipe 121 in which the hot exhaust gas generated by the combustion of hydrogen flows into the condenser 140.

Also installed at the hydrogen supplying pipe 111 are a hydrogen flow control valve 112 to control the flow rate of the hydrogen, at the oxygen supplying pipe 161 an oxygen flow control valve 162 to control the flow rate of the oxygen, and at the dilution gas supplying pipe 171 a dilution gas flow control valve 172 to control the flow rate of the dilution gas.

Here, the combustion chamber 120 is located in the engine 130. And, the spark trigger 220, in the case of external combustion engine, is used for initial ignition, and, in the case of internal combustion engine, is used for ignition at every cycle of explosion. When the engine 130 is an internal combustion engine, the cold exhaust gas is supplied to the combustion chamber 120 by the driving force of the engine 130 itself, but when the engine 130 is an external combustion engine, the cold exhaust gas is supplied to the combustion chamber 120, by the driving force of the blower 190, which is installed at the recycling pipe 150.

At the initial stage of the operation of the hydrogen combustion system, the combustion chamber 120 is prefilled with oxygen and dilution gas which is injected through the recycling pipe 150 from the oxygen supplier 160 and a dilution gas supplier 170 via the oxygen supplying pipe 161 and the dilution gas supplying pipe 171 respectively, and that the oxygen exists in excessive concentration for complete combustion of hydrogen. Under this atmosphere, the equation of combustion is as follows:

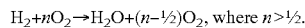

$$H_2 + nO_2 \rightarrow H_2O + (n-\tfrac{1}{2})O_2, \text{ where } n > \tfrac{1}{2}.$$

In the above equation, $nO_2$ is excessive oxygen in the combustion chamber, $(n-\tfrac{1}{2})O_2$ the residual oxygen in the hot exhaust gas. Here, the hot exhaust gas is composed of hot water vapor, residual oxygen and dilution gas.

As described above, before start the combustion reaction, the combustion chamber 120 is under the atmosphere of excessive oxygen, and after combustion, oxygen is additionally supplied into the combustion chamber 120 through the recycling pipe 150 from the oxygen supplying pipe 161 of the oxygen supplier 160. This is for enhancing system safety and efficiency by making sure that hydrogen is completely combusted by the excessive oxygen supplementing the oxygen consumed by the combustion reaction. The state of combustion of hydrogen is controlled by the flow rates of hydrogen, oxygen, dilution gas and the cold intake gas, and as will be described below, by the flow rate of the secondary coolant of the condenser 140.

The dilution gas which serves for reducing the flame temperature of hydrogen may not be supplied additionally during normal operation if the flame temperature is sufficiently reduced by the recycled cold intake gas. Generally, as hydrogen flow rate increases in the combustion chamber 120, the heat output and flame temperature of hydrogen also increase. In the present invention, the dilution gas and recycled cold intake gas are injected into the combustion chamber 120 in order to lower the flame temperature of hydrogen and also to prevent unexpected explosion of hydrogen. The flow rate of the dilution gas and oxygen may be determined according to the measured value of the flow rate of hydrogen, concentration of oxygen, flame temperature of hydrogen, pressure inside the combustion chamber 120, etc.

Since the dilution gas affects the system efficiency and cost, it should be selected in consideration of the characteristics of the system. It is preferable to urgently inject a large amount of the dilution gas into the combustion chamber 120 in order to reduce the concentration of the hydrogen below explosion point in case when the combustion of the hydrogen is stopped by abnormal event such as extinction of combustion or inadequate ignition.

Meanwhile, a cooling pipe 141 in which secondary coolant flows can be installed in the condenser 140 in order to convert the hot exhaust gas emitted from the combustion chamber 120 into low temperature gas and condensed water by using the secondary coolant. The inlet of the secondary coolant is connected to the source of supplied water (not shown). Sea water may be used as the secondary coolant. In this structure, the secondary coolant flows through the cooling pipe 141 into the condenser 140, enhancing the cooling effect through direct heat exchange with the hot exhaust gas. After the heat exchange, the secondary coolant is returned to the outside of system. The flow rate of the secondary coolant is controlled by the secondary coolant flow control valve 142 installed at the cooling pipe 141, and can change the rate of water condensation in the condenser 140. Secondary coolant pump is also required although it is not explained here in detail.

By using the condenser 140, the exhaust gas emitted from the combustion chamber 120 is converted to cold exhaust gas and a part of the cold exhaust gas is condensed to water. The condensed water is isolated from the cold exhaust gas by the separator 180 installed at the condenser 140. The condensed water separated by the separator 180 is drained through the condensed water exit 181 by opening and closing of the control valve 182. Drained condensed water can be stored on board to maintain the neutral buoyancy of submarine. The condensed water is stored, preferably, near the hydrogen supplier 110 and/or oxygen supplier 150 to minimize the change in the center of buoyancy of submarine.

As described so far, in the present invention, hydrogen is combusted in the combustion chamber 120 under atmosphere of dilution gas and excessive oxygen, transmitting the combustion heat (heat energy of the hydrogen flame) to the heat engine, while converting the hot exhaust gas emitted from the combustion chamber 120 through discharge pipe 121 to the cold exhaust gas by passing the gas through condenser 140, and recycling a part of the cold exhaust gas through the recycling pipe 150 into the combustion chamber 120, and draining the condensed water in the submarine.

Now, the method of combustion of the hydrogen combustion system with closed-cycle recycling of exhaust gas of the present invention will be described.

First, at the initial stage of operation, inside of the combustion chamber 120 is set under the atmosphere of excessive oxygen. At this stage, the dilution gas supplied from the dilution gas supplier 170 through the dilution gas supplying pipe 171 is also injected to the combustion chamber 120.

At this state, hydrogen combustion reaction is occurred under the atmosphere of excessive oxygen by supplying hydrogen fuel from the hydrogen supplying pipe 111 of the hydrogen supplier 110 to the combustion chamber 120. By the hydrogen combustion reaction, high temperature combustion heat (the heat energy of hydrogen flame) and water vapor is generated. The high temperature combustion heat is transferred to the heat engine 130, and hot exhaust gas is emitted through the discharge pipe 121. The engine 130 converts the high temperature combustion heat to mechanical or electrical energy. At the time of combustion reaction, hydrogen is completely combusted by excessive oxygen, and the flame temperature of hydrogen is reduced by the cold intake gas, thereby securing safe hydrogen combustion.

Then, the hot exhaust gas emitted by the discharge pipe 121 passes through condenser 140. The hot exhaust gas is composed of water vapor generated by the oxygen-hydrogen reaction, residual oxygen and dilution gas. The hot exhaust gas passing through the condenser 140 is cooled by heat exchange with the cooling pipe 141 in which secondary coolant flows. Here, the condensed water in the cold exhaust gas is separated by the separator 180, and the remaining exhaust gas is recycled via the recycling pipe 150 into the combustion chamber 120. In the process, a little amount of dilution gas may also be removed by resolving into the condensed water. The recycling cold intake gas is composed of water vapor, residual oxygen and dilution gas. The condensation rate of water vapor in the condenser 140 is mainly determined by the flow rate of secondary coolant.

At the process of recycling, the recycling cold exhaust gas is enriched with the oxygen and dilution gas supplied into the recycling pipe 150 from the oxygen supplier 160 and the dilution gas supplier 170.

The cold intake gas composed of water vapor, dilution gas and oxygen prepares combustion reaction again inside the combustion chamber 120, repeating the process of emitting the hot exhaust gas and recycling a part of the exhaust gas, as described above. The temperature of the hydrogen flame and the pressure in the combustion chamber is controlled by controlling the concentration of hydrogen, oxygen, dilution gas and water vapor and the flow rate of the cold intake gas.

Meanwhile, when the engine 130 is an external combustion engine, the cold intake gas is recycled to the combustion chamber 120 by the help of the driving force of the blower 190.

Example 2

Figure 2:
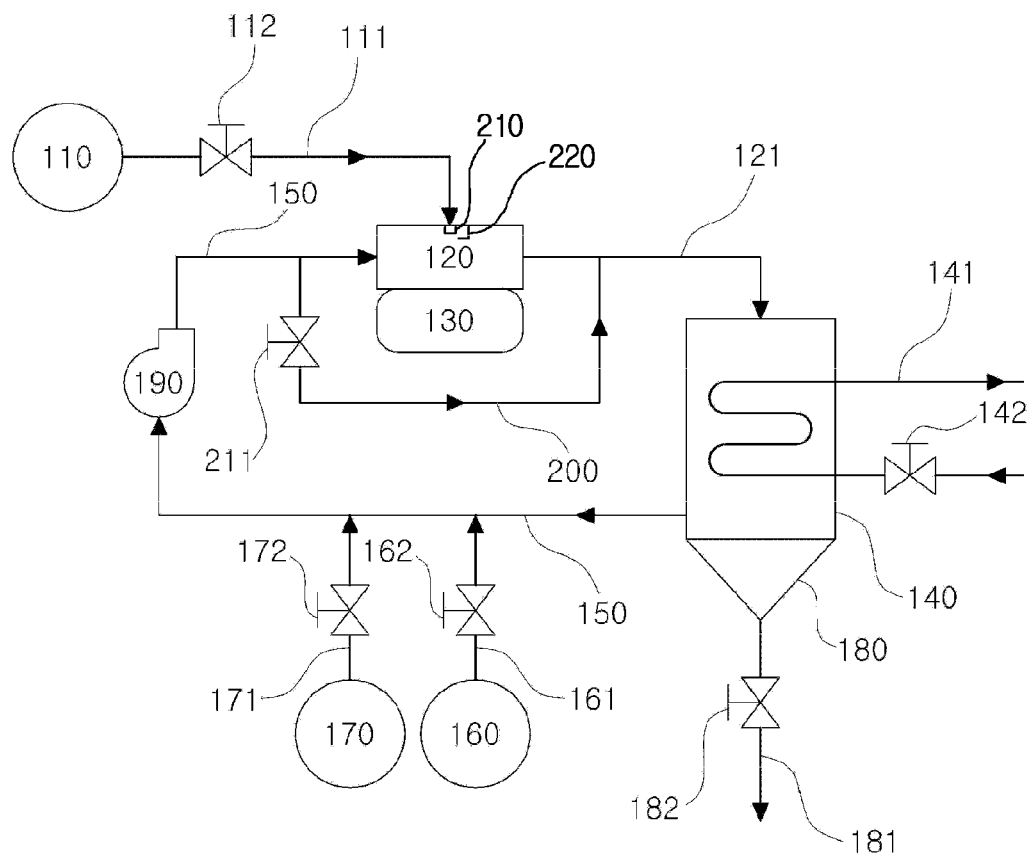
FIG. 2 schematically illustrates the construction of the hydrogen combustion system with closed-cycle recycling of exhaust gas according to the second embodiment of the present invention.

FIG. 2 schematically illustrates the construction of the hydrogen combustion system with closed-cycle recycling of exhaust gas according to the second embodiment of the present invention.

The hydrogen combustion system with closed-cycle recycling according to the second example of the present invention, as shown in FIG. 2, has the same structure as the first example except that bypass pipe 200 which is branched from the recycling pipe 150 and connected to the discharge pipe 121 in order to bypass a part of the cold intake gas. So the description of the same will be omitted, and same numeral will be used for the same construction as the first example.

Example 2 aims to further improve the safety of the system by diluting the hydrogen that could remain unexpectedly in the exhaust gas emitted from the combustion chamber 120. A control valve 211 is installed at the bypass pipe 200 to control the flow rate of the bypass gas.

The structure of example 2 provides better system safety due to the additional bypass pipe 200 compared to example 1, and only can be used when the flow of the cold intake gas is derived by the blower 190. Therefore, example 2 employs the structure where blower is installed at the recycling pipe 150, and applies for the external combustion engines such as sterling engine, steam turbine engine and gas turbine engine. When the engine is an external combustion engine, both the structure employing blower 190 as shown in FIG. 1 and the structure shown in FIG. 2 can be used. Contrarily, when the engine is an internal combustion engine, the blower 190 is unnecessary and only the structure shown in FIG. 1 would be used.

The present invention has been described in detail with reference to a preferable example. The invention, however, is not limited by the example, and it is obvious that the example can be variously modified by those skilled in the art within the scope of the present invention. Accordingly, the scope of the invention should be interpreted by the claims attached, and all technical ideas which are equivalent to the present invention should be regarded as belonging to the scope of the present invention.

DESCRIPTION OF THE NUMERALS IN THE DRAWINGS

110: hydrogen supplier
111: hydrogen supplying pipe
120: combustion chamber
130: engine
121: discharge pipe
140: condenser
141: cooling pipe
150: recycling pipe
160: oxygen supplier
161: oxygen supplying pipe
170: dilution gas supplier
171: dilution gas supplying pipe
180: separator
181: condensed water exit
190: blower
200: bypass pipe
112: hydrogen flow control valve
162: oxygen flow control valve
172: dilution gas flow control valve
142: secondary coolant flow control valve
211: bypass gas flow control valve

What is claimed is:

1. A hydrogen combustion system with closed-cycle recycling of exhaust gas, comprising:
    a hydrogen supplier which supplies hydrogen used as a fuel,
    a combustion chamber which is located in an external combustion engine and connected to a hydrogen supplying pipe of the hydrogen supplier in which the hydrogen supplied from the hydrogen supplier is combusted,
    a condenser which converts hot exhaust gas emitted through a discharge pipe installed on an outlet of the combustion chamber into cold exhaust gas and condensed water,
    a secondary coolant flow control valve installed for controlling a rate of water condensation in the condenser, and
    a recycling pipe which is connected between the condenser and an inlet of the combustion chamber and performs recycling of a part of the cold exhaust gas from the condenser to the inlet of the combustion chamber,
    wherein a blower is installed at a passage of the recycling pipe for driving and controlling a flow of cold intake gas, which is a mixture gas of oxygen, dilution gas and water vapor, into the combustion chamber.

2. The hydrogen combustion system of claim 1, further comprising an oxygen supplier including an oxygen supplying pipe and a dilution gas supplier including a dilution gas supplying pipe, which are connected to the recycling pipe respectively so that the dilution gas and excessive oxygen are supplied to the combustion chamber before starting the combustion of hydrogen and the cold intake gas which is recycled into the combustion chamber, the oxygen and the dilution gas being supplied into the combustion chamber through the recycling pipe after the combustion of hydrogen is started.

3. The hydrogen combustion system of claim 2, wherein a hydrogen flow control valve is installed at the hydrogen supplying pipe to control a flow rate of the hydrogen, oxygen flow control valve is installed at the oxygen supplying pipe to control a flow rate of the oxygen, and dilution gas flow control valve is installed at the dilution gas supplying pipe to control a flow rate of the dilution gas.

4. The hydrogen combustion system of claim 1, further comprising an injection nozzle inside the combustion chamber for injecting hydrogen fuel supplied from the hydrogen supplier into the combustion chamber through the hydrogen supplying pipe, and a spark trigger installed near the injection nozzle for igniting the hydrogen.

5. The hydrogen combustion system of claim 1, further comprising a separator installed at the condenser for separating the condensed water from the cold exhaust gas.

6. The hydrogen combustion system of claim 5, wherein a cooling pipe in which a secondary coolant flows, is installed in the condenser for cooling the hot exhaust gas emitted from the combustion chamber by the secondary coolant.

7. The hydrogen combustion system of claim 1, wherein the dilution gas is a chemically stable gas.

8. The hydrogen combustion system of claim 7, further comprising a bypass pipe which is branched from the recycling pipe between the blower and the combustion chamber for bypassing a part of the cold intake gas to the outlet of the combustion chamber.

9. The hydrogen combustion system of claim 8, wherein a bypass flow control valve is installed at the bypass pipe for controlling a flow rate of the bypassing cold intake gas.

10. A method for combusting hydrogen with closed-cycle recycling of exhaust gas, comprising the steps of:
  (a) combusting hydrogen in a combustion chamber in an external combustion engine under atmosphere of excessive oxygen,
  (b) cooling hot exhaust gas emitted through a discharge pipe of the combustion chamber into cold exhaust gas and condensed water by using a condenser,
  (c) controlling a secondary coolant flow for controlling a rate of water condensation in the condenser,
  (d) recycling a part of the cold exhaust gas from the condenser to the combustion chamber through a recycling pipe, and
  (e) driving and controlling a flow of cold intake gas, which is a mixture of oxygen, dilution gas, and water vapor, into the combustion chamber using a blower.

11. The method for combusting hydrogen of claim 10, wherein, in the step (a), the dilution gas for diluting hydrogen is prefilled in the combustion chamber, and in the step (b), the hot exhaust gas is cooled by secondary coolant.

12. The method for combusting hydrogen of claim 11, wherein the step (d) further comprises a step of supplying the oxygen and the dilution gas to the cold intake gas recycled to the combustion chamber.

13. The method for combusting hydrogen of claim 12, wherein a large amount of the dilution gas is urgently injected into the combustion chamber in order to reduce a concentration of the hydrogen below explosion point in case when the combustion of the hydrogen is stopped by abnormal event such as extinction of combustion or inadequate ignition.

14. The method for combusting hydrogen of claim 13, wherein a state of combustion of hydrogen in the combustion chamber is controlled by supplying flow rates of hydrogen, oxygen, dilution gas and secondary coolant as well as a flow rate of cold intake gas.

15. The method for combusting hydrogen of claim 14, wherein the dilution gas is a chemically stable gas.

16. The method for combusting hydrogen of claim 12, wherein the hot exhaust gas is composed of residual oxygen, dilution gas and water vapor.

17. The method for combusting hydrogen of claim 11, wherein the step (b) further comprises a step of separating by a separator the condensed water produced by the condensation of the cold exhaust gas at the condenser.

18. The method for combusting hydrogen of claim 10, further comprising the step of bypassing a part of the cold intake gas from an outlet of the blower to an outlet of the combustion chamber.

\* \* \* \* \*